W. F. CHANNING & M. G. FARMER.
Electro-Magnetic Fire-Alarm Telegraph for Cities.
No. 6,239. Reissued Jan. 19, 1875.
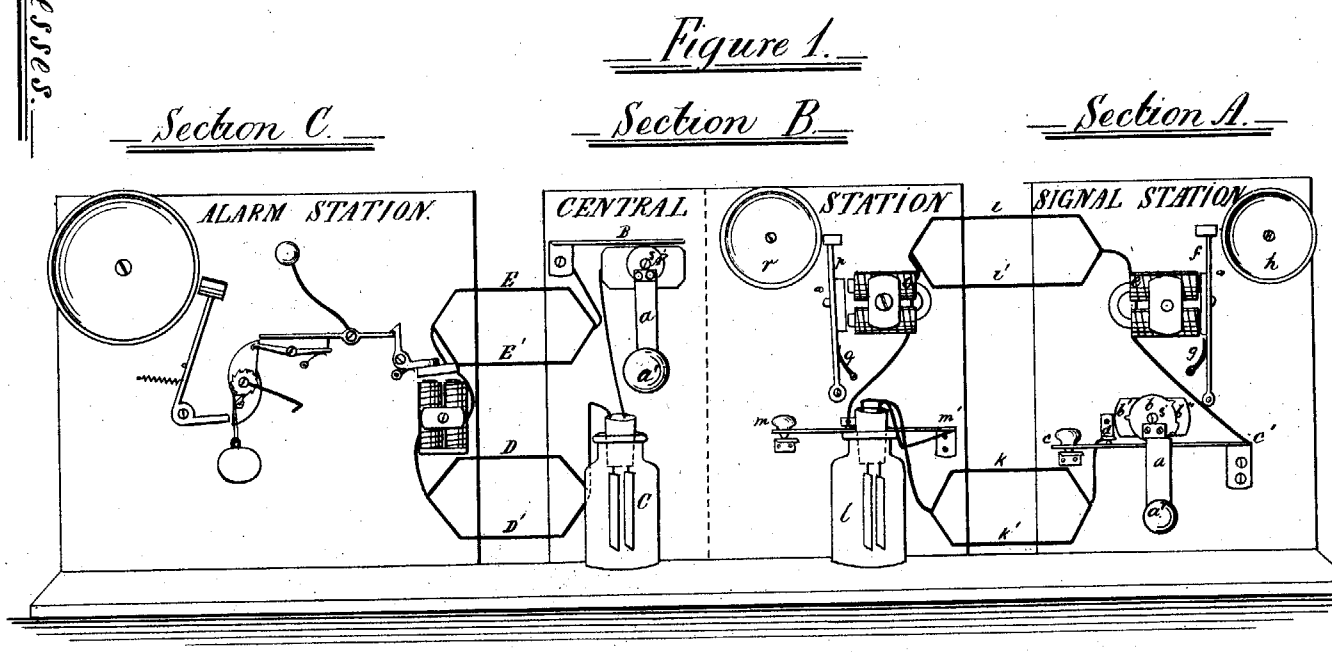
Witnesses.
T. C. Smith
Harry Coleman.
Inventor.
William F. Channing
Moses G. Farmer
By J. P. Hitch Their atty
N. PETERS, Photo-Lithographer, Washington, D. C.

UNITED STATES PATENT OFFICE.

WILLIAM F. CHANNING, OF PROVIDENCE, RHODE ISLAND, AND MOSES G. FARMER, OF SALEM, MASSACHUSETTS.

IMPROVEMENT IN ELECTRO-MAGNETIC FIRE-ALARM TELEGRAPHS FOR CITIES.

Specification forming part of Letters Patent No. 17,355, dated May 19, 1857; extended seven years; reissue No. 6,239, dated January 19, 1875; application filed December 18, 1874.

DIVISION A.

*To all whom it may concern:*

Be it known that we, WILLIAM F. CHANNING, of Providence, Providence county, State of Rhode Island, and MOSES G. FARMER, of Salem, county of Essex, State of Massachusetts, have invented certain new and useful Improvements in Electric Telegraphs and Telegraphic Machinery, which we call the American Fire-Alarm Telegraph; and we do hereby declare that the same is fully described and represented in the following specifications and the accompanying drawings, letters, figures, and references thereto.

The invention embodied in said telegraph, which we intend to claim in this division of this reissue as new, relates only to the signal system and the alarm system, proper, so called, hereinafter described. But as these two systems are in some measure dependent upon the other inventions, which we claim in separate divisions of this reissue, we will describe substantially the entire organization of the said telegraph, as by so doing the construction and functions of the devices claimed in this division will be more readily and fully understood.

The accompanying drawings represent on a small scale a general view of the American fire-alarm telegraph, or telegraphic alarm system in its five principal parts, namely: The signal-station, shown by section A; the central station, shown by section B; the alarm-station, shown by section C; the signal-circuit, the portion of which between the stations is shown by the lines *i i′ k k′*; and the alarm-circuit, the portion of which between the stations is shown by the lines D D′ E E′. These drawings also show the connection and mutual dependence of said parts.

The object of the American fire-alarm telegraph is to give an instantaneous and definite audible alarm, either general or local, in a city or town, in case of fire, and to designate the locality of the fire.

The object of the signal-station is to indicate, by recorded or audible signals, the existence and locality of a fire in its neighborhood to the central station, and to other signal-stations. The number of signal-stations in the fire-telegraph system should, therefore, be multiplied in proportion to the size of the city or town, in order to place one within a suitable distance of every house.

The object of the central station is to receive intelligence of the existence and locality of a fire from a signal-station in the neighborhood of a fire, and to give a corresponding audible public alarm, through the alarm and signal stations, by means of machinery operated or controlled by telegraphic action or influence emanating from the central station.

The object of the alarm station, which is usually a belfry or bell-tower, is to give public alarm by means of blows upon a bell struck by machinery, the action of which is controlled from the central station by telegraph. Instead of a bell, other suitable mechanism for producing sound may be substituted, the same being called into action or controlled from the central station by telegraph.

The function of the signal-circuit is to connect telegraphically one or more signal-stations with a central station, and with each other, or simply to connect signal-stations with each other, and to combine any or all of such stations into a signal system for signalizing alarms of fire.

The function of the alarm-circuit is to connect telegraphically one or more alarm-stations with a central station, and with each other, so as to combine such stations into an alarm system for giving public alarms in case of fire.

We will now describe in detail the several parts of the machinery and apparatus belonging to the system or telegraph, in order to enable those skilled in electro-magnetism to construct and use our invention.

Section A, Figure 1, represents the apparatus of a signal-station. *h* represents a bell or other sonorous piece of metal, which is struck by a hammer on the end of the armature *f* of the electro-magnet *e*. *g* is a spring, which forces the armature-lever *f* back against the bell *h*, when the electro-magnet *e* is discharged. *c c'* is a break-circuit key, closing the circuit when pressing against the anvil *d*. This key is operated by the action of the circuit-wheel *b*, which is mounted on a shaft, *s*, and turned or caused to rotate by means of the crank *a*, either with or without the intervention of intermediate gearing. Upon the circuit-wheel are represented two groups of teeth, which groups are separated from each other by spaces greater than the spaces which separate the individual teeth of the groups. One of these groups may, by the number of its teeth, represent the number of the fire-district in which the signal-station is situated. The other group may, by conventional agreement, represent the number of the signal-station itself in that district. Instead of the arrangement for breaking and closing the circuit which has been above described, any equivalent or known form and arrangement of circuit-breaker and spring may be used, constructed, and arranged to produce the same effect.

The signal-station consists of the signalizing apparatus described, which may be located in or near an engine-house. The signal-circuit consists of electrical conductors extending between and passing through one or more signal-stations, and usually through a central station embracing all, and uniting all, such signal-stations and the receiving instruments at such central stations into a system of signalizing alarms of fire. It may consist, however, of conductors connecting and including signal-stations alone, without including a central station, so that an alarm would be signalized from one to all the others by means of the circuit-wheel in the station giving the alarm, and by means of the magnet and bells in all the others.

The conductors of the signal-circuit consist usually of telegraphic wires suitably insulated. It is advisable to use duplicate wires, Fig. 1, *i i' k k'*, following different routes between all the stations, so as to lessen greatly the probability of interruption from accident or design. In some cases threefold or manifold wires might be used.

To make interference with the circuits more difficult, the use of the ground as part of any circuit may with advantage be entirely dispensed with. In the drawings the conductors of the signal-circuit *i i' k k'* are represented as connecting only one signal-station and the alarm-station. It is intended that two or more signal-stations shall be included in the same circuit, and the conductors of such circuit may connect not only the nearest signal-station with the central station, but neighboring signal-stations with each other.

There may be several signal-circuits radiating like the petals of a flower from the central station, or otherwise, and on each of these signal-circuits there may be one or many signal-stations; but the whole of such circuits and signal-stations, however divided or varied in arrangement for purposes of convenience or economy in construction, still constitute, if connected in function, one signal system, the essential purpose of which is to bring all parts of a municipality into communication with a center or with each other by the indefinite multiplication of associated signalizing-points within or over a given area.

By this means a higher municipal organization may be effected for the purposes set forth than has heretofore been possible.

In furtherance of this object a city or town provided with this system may be conveniently divided into several fire-districts, in each of which may be one or more signal-stations duly numbered or otherwise designated.

The receiving apparatus at the central station consists, in general, of a galvanic battery, *l*, or other generator of electric currents, an electro-magnet, *o*, with its armature hammer and spring *p q*, and a small bell, *r*, or its equivalent. If desirable, a "dot-and-line" register or recording instrument may be added in any of the well-known ways. There is also a key, *m m'*, which is conveniently used both to correspond with the signal-stations and also to indicate by the number of taps on the key *m m'*, and by the corresponding action of the armatures and bells in the signal-stations, the number of the signal-station which originated the alarm. The transmitting apparatus of the central station consists in general of a galvanic battery, C, section B or its equivalent, an automatic or other apparatus, A A' B, for connecting at suitable times and intervals the alarm-battery C with the wires E E' D D' of the alarm circuit or circuits. A simple form of this apparatus may be a crank, A, a circuit-wheel, A', and spring B, the circuit-wheel having a number of teeth, A', corresponding with the number of the district to be indicated on the bells, and these teeth, by the rotation of the wheel, coming into contact with spring B, and thereby connecting one pole of the battey C with the alarm-circuit D D', the other pole of the battery C being already connected with the return part (so to speak) E E of the alarm-circuit.

Where a city is of great extent, or where for any reason it may be desirable, two or more central stations may be used instead of a single central station. Central stations may also sometimes be conveniently combined with an alarm-station.

The alarm-circuit consists of electrical conductors extending between and including one or more alarm-stations and the transmitting instruments of the central station. These conductors are usually duplicate and well insulated telegraphic wires between the stations, as in the signal-circuit already described, their object and effect being to establish telegraphic communications between the stations, and to connect the functions of the transmitting instruments of the central station with those of the alarm machinery at the alarm-station. There may be several alarm-circuits, each including several alarm-circuits, in the same way as there may be several signal-circuits.

In the drawings, the conductors of the alarm-circuit, Fig. 1, D D′ E E′, are represented as connecting one alarm-station with the central station. If more than one alarm-station is included in the same alarm-circuit it will be understood that the conductors of the alarm-circuit will connect not only the nearest alarm-station with the central station, but neighboring alarm-stations with each other. When two or more alarm-stations are included in the same alarm-circuit the bells at such stations may strike synchronously in obedience to any telegraphic impulse sent to them from the central station through the proper apparatus. Where there are two or more alarm-circuits radiating from the central station, they may be united at the central station, so as to constitute really but a single electrical circuit; or the same electrical impulse may be sent over them, each in rapid succession, whereby a great saving of electrical power may be attained, and the practical result of nearly synchronous action at the alarm-stations be still preserved. In either case they constitute one alarm system. The alarm-circuits may be divided or varied in arrangement for purposes of convenience and economy of construction, and each circuit may include any desirable number of alarm-stations, but they still constitute, if connected with the central station, one alarm system, and a part or the whole of this system may be called into action at once, according as it is desired to give a partial or general alarm of fire in a city for the better accomplishment of the purpose of municipal organization set forth.

For a full and exact description of the kind of apparatus suitable to be used at the alarm-stations, reference is had to Letters Patent No. 8,920, which were granted to MOSES G. FARMER, aforesaid, by the United States government on the 4th day of May, 1852.

But, for the sake of exhibiting the machinery in its connection, a simple form of the electro-magnetic alarm-bell apparatus mentioned above is represented in the drawings, but no detailed description thereof is deemed necessary here.

To show the operation and connection of the several parts of our system, suppose a fire is discovered in the vicinity of the signal-station represented in section A, an authorized person—say, a watchman—opens the signal-box, and turns the crank *a* ten or twenty times moderately fast. The teeth *b′ b″* on the circuit-wheel, in the course of its revolution, depress the key *c c′*, and in this manner break and restore the circuit at definite intervals and a definite number of times, the key returning by its own elasticity, and thus closing the circuit when not depressed by the teeth *b′ b″*. The breaking and restoring the circuit by the operation of the signal-wheel *b* and key *c c′* causes the electro-magnet and armature at the central station, by repeated strokes on the bell *r*, to indicate to the operator there the number of the district and station whence the alarm originates, and also gives the like indication at each signal-station on the line.

The operator at the central station, upon thus learning the existence and locality of the fire, puts in motion the transmitting apparatus A A′ B, and thereby causes the bells at the alarm-station to indicate, by the number of their strokes, the locality whence the alarm originates.

The operator may also tap on the key *m m′* the number of the signal-station originating the alarm, and thereby repeat the indications thus given on the line where the alarm originates over all the other lines, or telegraph other intelligence. The firemen may thus be able at once to take their engines, by the nearest route, to the fire.

It has been stated that for the sake of more perfect security it is better to construct both the signal and alarm circuits with double wires, running by different routes, as represented at *i i′ k k′* and E E′ D D′. The arrangement of these duplicate conductors may be varied for open or closed circuits, in connection with the apparatus at the stations, in modes which would readily suggest themselves to any person conversant with electro-magnetic telegraph apparatus.

The conductors of the American fire-alarm telegraph may be carried, duly insulated, on posts through the streets, or under ground; but may be, preferably, carried over the tops of houses, where they are less liable to injury.

We do not, in this division, claim the union signal system and the alarm system with a central station; nor do we claim, by themselves, the circuit-wheel and accompanying mechanism constituted and arranged to automatically restore the circuit to its normal condition after being broken or closed, for the purpose of signalizing; nor by themselves an electro-circuit and one or more sounding mechanisms and a circuit-wheel controlling the circuit to occasion the producing, by the said mechanism, a determinate series of audible signals; nor the two or more groups of circuit-breaking or circuit-closing points, as described, the same being reserved for other divisions of this reissue.

What we do claim is—

1. The signal system herein described, consisting of a series of signal-stations scattered at intervals through a whole city or town, or any part thereof, and telegraphically connected with a common center or point, or with each other, by one or more signal-circuits, by which means a constant communication may be established and maintained between all parts of a city or town, however extended, and with the center or centers at which the signal circuit or circuits converge or meet, so that the moment a fire occurs its existence and locality may at once be known at the center of the system, and efforts for subduing it be properly directed.

2. The alarm system herein described, consisting of a series of alarm-stations suitably distributed throughout a whole city or town, or any part thereof, and telegraphically connected with a central station by one or more alarm-circuits, by which means a public alarm of the existence and locality of the fire may be given at different points.

WM. F. CHANNING.
MOSES G. FARMER.

Witnesses:
J. P. FITCH,
JAS. M. GARDINER.